US012789617B2

(12) United States Patent
Tani et al.

(10) Patent No.: US 12,789,617 B2
(45) Date of Patent: Nov. 10, 2026

(54) LIQUID STORAGE DEVICE

(71) Applicant: TOYOTA JIDOSHA KABUSHIKI KAISHA, Aichi-ken (JP)

(72) Inventors: Masaaki Tani, Toyota (JP); Tomofumi Hagino, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/969,265

(22) Filed: Dec. 5, 2024

(65) Prior Publication Data

US 2025/0196617 A1 Jun. 19, 2025

(30) Foreign Application Priority Data

Dec. 15, 2023 (JP) ................................ 2023-211916

(51) Int. Cl.
*B60K 11/02* (2006.01)
*B60K 1/00* (2006.01)

(52) U.S. Cl.
CPC ........ *B60K 11/02* (2013.01); *B60K 2001/005* (2013.01)

(58) Field of Classification Search
CPC ........ B60K 11/02; B65D 88/36; B65D 88/42; B65D 88/34
USPC ........................................ 220/562, 218, 216
See application file for complete search history.

(56) References Cited

U.S. PATENT DOCUMENTS

| | | | | | |
|---|---|---|---|---|---|
| 289,557 | A * | 12/1883 | Reinecke | B65D 88/34 160/231.1 |
| 1,872,735 | A * | 8/1932 | Gunther | A01F 25/16 220/222 |
| 5,213,230 | A * | 5/1993 | Kral | B44D 3/12 220/216 |
| 8,235,241 | B2 * | 8/2012 | Ramsay | B60K 15/077 220/563 |
| 2022/0099017 | A1 | 3/2022 | Sakata | |

FOREIGN PATENT DOCUMENTS

| | | | |
|---|---|---|---|
| GB | 890422 | A | 2/1962 |
| JP | 2022-061056 | A | 4/2022 |
| JP | 2023-071353 | A | 5/2023 |

* cited by examiner

*Primary Examiner* — Robert J Hicks
(74) *Attorney, Agent, or Firm* — HAUPTMAN HAM, LLP

(57) ABSTRACT

The liquid storage device comprises a reservoir tank that is equipped on a vehicle and that stores a liquid; and a floating cover that floats on a liquid surface of the liquid in the reservoir tank and that covers at least a part of the liquid surface, wherein the reservoir tank includes: a body configured to store the liquid; and a tank inlet having a smaller diameter than the body, and the floating cover has elasticity to such an extent that the floating cover can change from a stored state in which the floating cover can pass through the tank inlet to a deployed state in which the floating cover is spread along the liquid surface by elastic restoring force.

4 Claims, 6 Drawing Sheets

LIQUID STORAGE DEVICE

CROSS REFERENCE TO RELATED APPLICATION

This application claims priority to Japanese Patent Application No. 2023-211916 filed on Dec. 15, 2023, which is incorporated herein by reference in its entirety including the specification, claims, drawings, and abstract.

TECHNICAL FIELD

This specification discloses a liquid storage device that is equipped on a vehicle and stores liquid.

BACKGROUND

Conventionally, many liquid storage devices that are equipped on vehicles and store liquid have been proposed. For example, Patent Document 1 discloses a liquid-cooled cooling system for cooling an internal combustion engine, an electric element, an electronic substrate, and the like. The liquid-cooled cooling system includes a reservoir tank that stores a cooling liquid. The reservoir tank of the Patent Document 1 includes a tank body, an inflow pipe that feeds the cooling liquid into the tank body, a columnar member, and a guide member. Both the columnar member and the guide member are fixed inside the tank main body. The liquid sent from the inflow pipe to the tank main body hits the columnar member and the guide member, so that the waviness of the cooling liquid and the generation of air bubbles are suppressed to some extent.

However, in the case of the Patent Document 1, since both the columnar member and the guide member are fixed to the tank main body, the columnar member and the guide member cannot appropriately follow the change in the liquid level. In addition, in the case of Patent Document 1, since almost the entire liquid surface is not restrained, it is not possible to sufficiently suppress undulation on the liquid surface. Since many waves are generated on the liquid surface, air is entrained in the liquid and bubbles are generated. That is, in the technique of Patent Document 1, the generation of air bubbles cannot be sufficiently suppressed.

Therefore, this specification discloses a liquid storage device capable of more effectively suppressing the generation of air bubbles.

CITATION LIST

PATENT DOCUMENT 1: JP. 2022-061056.A

SUMMARY

A liquid storage device disclosed in this specification comprises a reservoir tank that is equipped on a vehicle and that stores a liquid; and a floating cover that floats on a liquid surface of the liquid in the reservoir tank and that covers at least a part of the liquid surface, wherein the reservoir tank includes: a body configured to store the liquid; and a tank inlet having a smaller diameter than the body, and the floating cover has elasticity to such an extent that the floating cover can change from a stored state in which the floating cover can pass through the tank inlet to a deployed state in which the floating cover is spread along the liquid surface by elastic restoring force.

By providing the floating cover that floats on the liquid surface, generation of air bubbles is appropriately suppressed even when the liquid surface level changes.

In this case, the floating cover may have a float portion having a specific gravity smaller than a specific gravity of the liquid.

With such a configuration, the floating cover can be prevented from sinking into the liquid, and air bubbles can be more reliably suppressed.

Further, the floating cover may have an umbrella-like shape, and the floating cover may include: a covering sheet covering at least a part of the liquid surface; and a plurality of frames arranged radially and to which the covering sheet is fixed.

With this configuration, the floating cover can be changed between the stored state and the deployed state with a simple configuration. Further, since the floating cover has the frames, unintended bending of the floating cover is effectively suppressed.

In addition, the reservoir tank further may include an inflow port provided on a first side wall of the body and configured to guide the liquid in a horizontal inflow direction, and the floating cover in the deployed state may have a shape in contact with or proximal to a second side wall opposed to the first side wall at a position directly facing the inflow port in the inflow direction in a plan view.

With this configuration, the floating cover can cover a portion where the liquid is likely to splash. As a result, the generation of air bubbles is more effectively suppressed. In addition, in each of two horizontal directions intersecting each other, a dimension of the floating cover may be substantially the same as or slightly smaller than an inner dimension of the reservoir tank.

With this configuration, movement of the floating cover in the reservoir tank is suppressed.

According to the liquid storage device disclosed in this specification, generation of air bubbles is more effectively suppressed.

BRIEF DESCRIPTION OF DRAWINGS

Embodiment(s) of the present disclosure will be described based on the following figures, wherein.

DESCRIPTION OF EMBODIMENT

Figure 1:
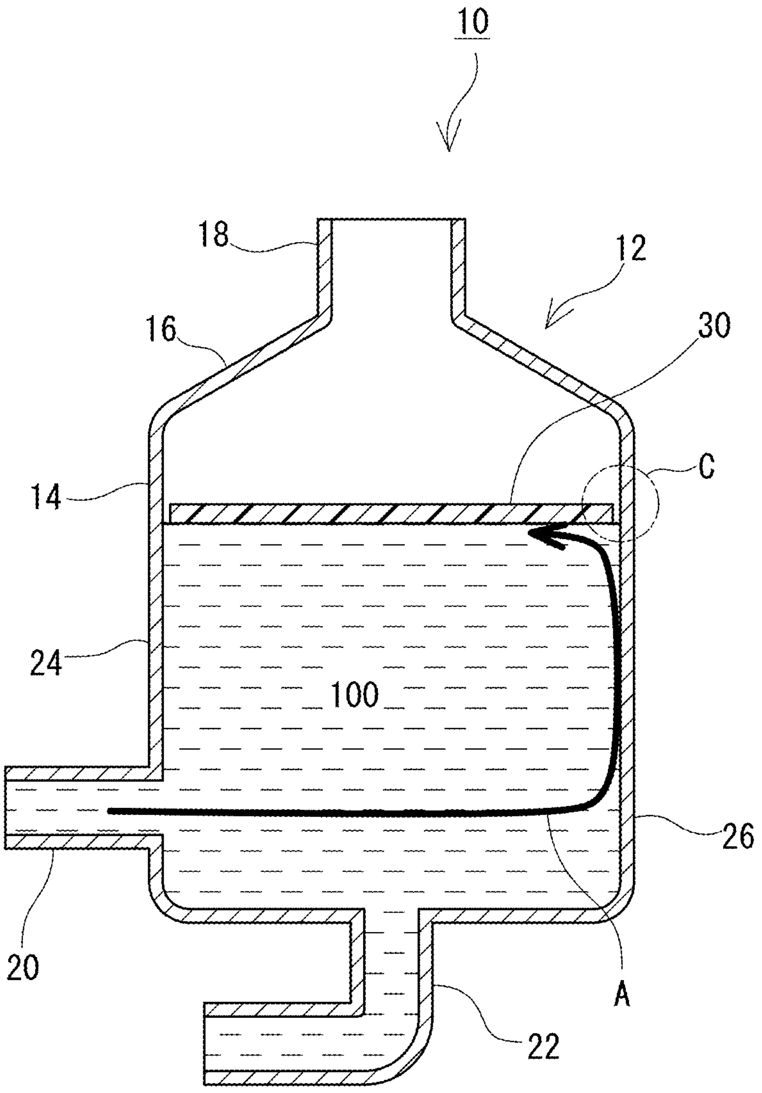
FIG. 1 is a schematic cross-sectional view of a liquid storage device.

Hereinafter, a configuration of the liquid storage device 10 will be described with reference to the drawings. FIG. 1 is a schematic cross-sectional view of a liquid storage device 10. The liquid storage device 10 is mounted on a vehicle and stores liquid. For example, the liquid storage device 10 is a device that stores a cooling liquid 100 for cooling an in-vehicle battery. The liquid storage device 10 is provided to absorb a volume variation of the cooling liquid 100 due to a temperature change or to perform gas-liquid separation of the cooling liquid 100.

The liquid storage device 10 includes a reservoir tank 12 and a floating cover 30. The reservoir tank 12 is a container that stores the cooling liquid 100. The reservoir tank 12 is, for example, a container made of resin or metal. In this specification, a container in which a small-diameter tank inlet 18 is disposed on a large-diameter body 14 will be described as an example. A tapered shoulder 16 exists between the tank inlet 18 and the body 14.

As shown in FIG. 1, the inflow port 20 protrudes outward in the horizontal direction from the side wall of the body 14. Hereinafter, the side wall on which the inflow port 20 is disposed is referred to as a "first side wall 24", and the protruding direction of the inflow port 20 is referred to as an "inflow direction". A side wall facing the first side wall 24 in the inflow direction is referred to as a "second side wall 26".

As described above, the inflow port 20 protrudes outward in the inflow direction. In the process of passing through the inflow port 20, a flow in the inflow direction is generated in the cooling liquid 100. Therefore, even after flowing into the reservoir tank 12, the cooling liquid 100 flows downstream in the inflow direction, that is, in a direction approaching the second side wall 26. An arrow A in FIG. 1 indicates the flow of the cooling liquid 100. As shown in FIG. 1, a part of the cooling liquid 100 further collides with the second side wall 26 and then travels upward along the second side wall 26.

An outflow port 22 is formed in the bottom wall of the body 14. The outflow port 22 protrudes downward from the bottom wall and then extends in the horizontal direction. The inflow port 20 and the outflow port 22 both communicate with a flow path such as a cooling circuit. The cooling liquid 100 circulates through the cooling circuit via the reservoir tank 12. Here, during the period in which the cooling liquid 100 remains in the reservoir tank 12, the air bubbles contained in the cooling liquid 100 gather upward. As a result, the cooling liquid 100 from which the air bubbles are removed is output from the outflow port 22. This effectively prevents air lock in which the pressure of the pump is less likely to be transmitted to the cooling liquid 100 due to air bubbles. The volume of the reservoir tank 12 is sufficiently larger than the volume of the cooling liquid 100 to be stored. By providing the reservoir tank 12 in the circulation path of the cooling liquid 100, the volume change of the cooling liquid 100 caused by the temperature change is absorbed.

The floating cover 30 is a covering member that floats on the liquid surface of the cooling liquid 100 and covers at least a part of the liquid surface. The floating cover 30 is deformable between a stored state and a deployed state. The deployed state is a state in which the floating cover 30 spreads along the liquid surface. FIG. 1 shows the floating cover 30 in a deployed state. On the other hand, the stored state is a state in which the floating cover 30 is small enough to pass through the small-diameter tank inlet 18 and is folded or compressed.

Normally, the floating cover 30 is brought into the stored state by being pressed by the hand of the user. When the user stops pressing, the floating cover 30 automatically changes to the deployed state by the elastic restoring force.

The floating cover 30 is not limited in shape or material as long as it floats on the liquid surface and automatically restores from the stored state to the deployed state. Therefore, the floating cover 30 may be a sponge sheet or a rubber sheet having a certain thickness.

Figure 2:
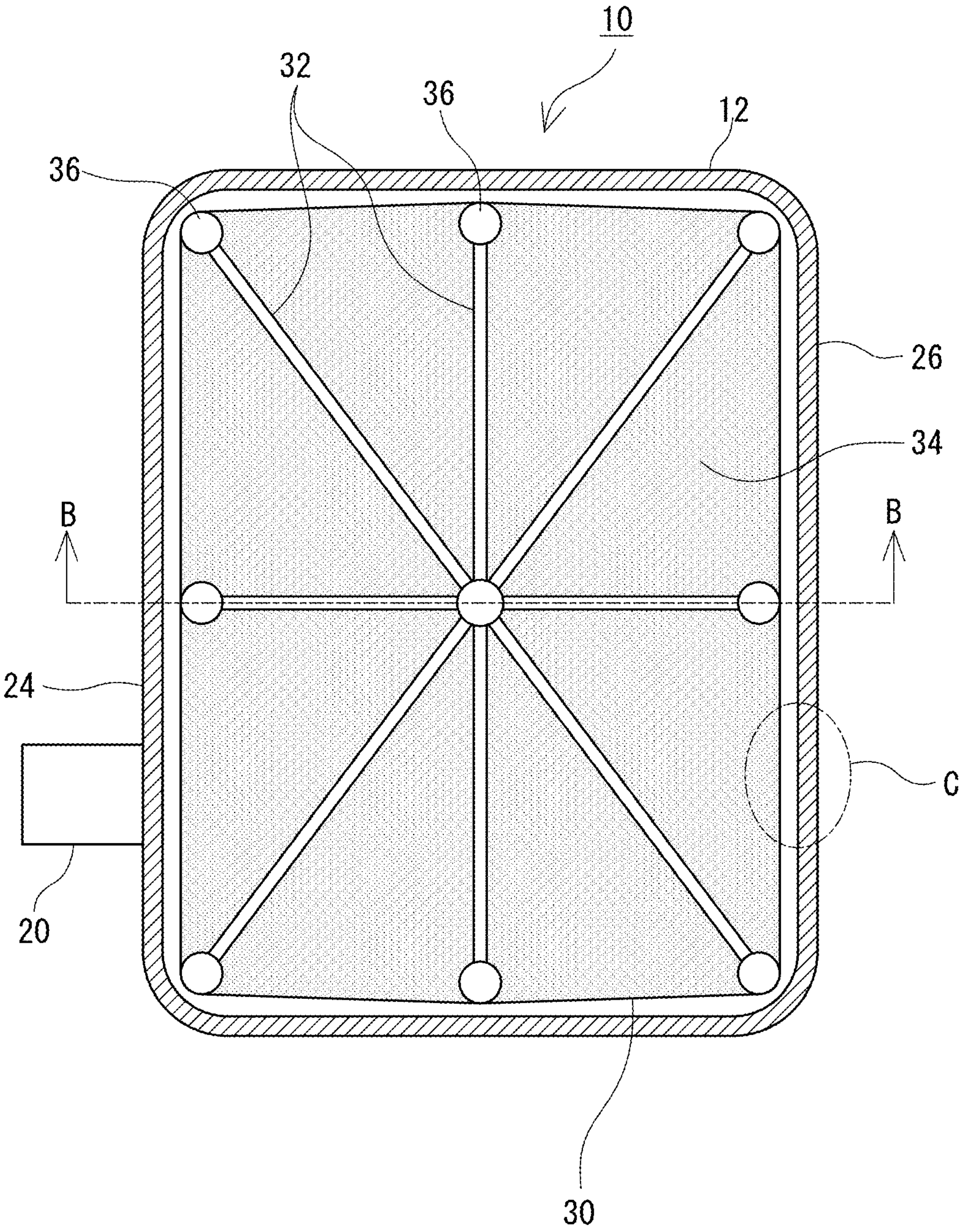
FIG. 2 is a top view of a floating cover having a frame.
Figure 3:
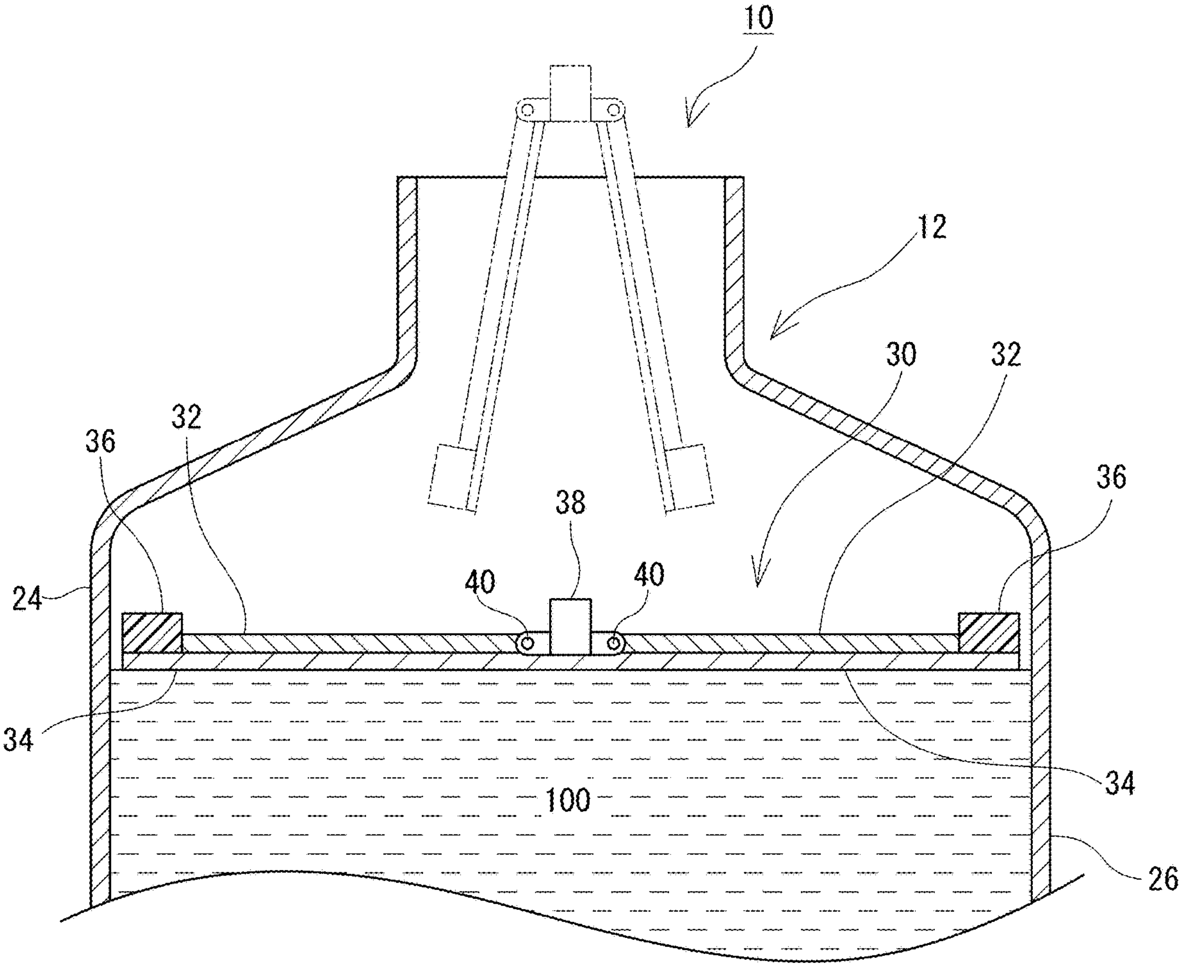
FIG. 3 is a cross-sectional view taken along line B-B of FIG. 2.

The floating cover 30 may include one or more frames and a covering sheet. FIG. 2 is a top view of the floating cover 30. FIG. 3 is a cross-sectional view taken along line B-B of FIG. 2.

The floating cover 30 of FIG. 2 is substantially umbrella-shaped. More specifically, the floating cover 30 includes a central joint 38, a plurality of frames 32 extending radially from the central joint 38, a covering sheet 34, and a float portion 36. One end of the frame 32 is connected to the central joint 38 by a hinge 40. When the frame 32 swings about the hinge 40, the floating cover 30 changes between the stored state and the deployed state. The materials of the central joint 38 and the frame 32 are not particularly limited, but in order to prevent rust, they may be made of a resin or a metal coated with an anti-rust coating.

A float portion 36, which will be described later, is attached to a tip end of each of the plurality of frames 32. The float portion 36 is a member that adjusts buoyancy acting on the floating cover 30. In this example, the specific gravity of the float portion 36 is sufficiently smaller than the specific gravity of the cooling liquid 100. Therefore, when the floating cover 30 is inserted into the liquid while remaining in the stored state, the frame 32 automatically opens due to the buoyancy acting on the float portion 36, and transitions to the deployed state. In order to reliably open the frame 32, a spring for biasing the frame 32 in the opening direction may be provided. In this case, the float portion 36 may be omitted.

The covering sheet 34 is a sheet material that covers the entire plurality of frames 32 and is fixed to the frames 32. As shown in FIG. 2, the covering sheet 34 may be secured to the frame 32 and the underside of the float portion 36 in the deployed state. With such a configuration, a gap is less likely to be formed between the covering sheet 34 and the liquid surface, and it is possible to effectively suppress undulation described later.

The covering sheet 34 is formed of, for example, a waterproof sheet that does not allow water to pass therethrough, such as a polyester sheet. The waterproof sheet may be a moisture-permeable waterproof sheet that does not allow water to pass therethrough but allows steam to pass therethrough. The covering sheet 34 may be a water-permeable sheet, such as a cloth, as long as the floating cover 30 is maintained in a floating state. The covering sheet 34 has flexibility enough to sufficiently follow the swing of the frame 32. That is, when the plurality of frames 32 are closed, the covering sheet 34 forms a large fold, such as fabric of a closed umbrella. When the plurality of frames 32 are open, the covering sheet 34 spreads in a flat shape so as not to cause wrinkles.

Next, the reason why the floating cover 30 is provided will be described. The cooling liquid 100 stored in the reservoir tank 12 may be waved due to vibration of the vehicle, water flow, or the like. In particular, when the cooling liquid 100 vigorously flows into the reservoir tank 12 from the inflow port 20, a water flow as indicated by an arrow A in FIG. 1 is generated, and the cooling liquid 100 may splash from the liquid surface. Due to such undulation, air may be entrained in the liquid, and bubbles may be generated in the cooling liquid 100.

If a large amount of air bubbles are mixed into the cooling liquid 100, the pressure of the pump is not appropriately transmitted to the cooling liquid 100, which leads to a decrease in cooling efficiency and an increase in power consumption. Therefore, many techniques for suppressing undulation of the cooling liquid 100 have been proposed. For example, it has been proposed that a predetermined guide member is provided inside the reservoir tank 12 and a flow of water is hit against the guide member to change a flow direction of the water or abrade a momentum of the water, thereby suppressing undulation.

Here, the liquid level of the cooling liquid 100 stored in the reservoir tank 12 changes according to the situation.

When the liquid level is changed, the arrangement of the guide member suitable for suppressing air bubbles is also changed. However, in the related art, the guide member is fixed to the reservoir tank 12. Therefore, the guide member of the related art cannot follow the change in the liquid level, and the generation of air bubbles cannot be sufficiently suppressed. In addition, in the related art, since the entire liquid surface of the cooling liquid 100 is opened, undulation on the liquid surface cannot be sufficiently suppressed.

On the other hand, the technology disclosed in the present specification includes the floating cover 30 floating on the liquid surface. Since the floating cover 30 is configured to float on the liquid surface, it can always follow a change in the liquid surface level. As a result, according to the technology disclosed in the present specification, undulation on the liquid surface is suppressed, and generation of bubbles is effectively suppressed. The floating cover 30 covers a part of the liquid surface in a state of being in contact with the liquid surface. In other words, there is no or a small air layer between the covering sheet 34 and the liquid surface. Therefore, even if the cooling liquid 100 splashes from the liquid surface, the cooling liquid 100 hits the covering sheet 34. As a result, the flow direction of the cooling liquid 100 changes without the cooling liquid 100 touching the air layer. As a result, the generation of undulations and thus bubbles is effectively suppressed.

As described above, when the cooling liquid 100 vigorously flows into the reservoir tank 12 from the inflow port 20, a water flow as indicated by an arrow A in FIG. 1 is generated. This water flow proceeds from the inflow port 20 in the inflow direction, hits the second side wall 26, and goes upward. Therefore, when the water flow indicated by the arrow A is generated, splashing of the cooling liquid 100 is likely to occur at a position directly facing the inflow port 20 and the inflow direction in a plan view, that is, at a portion C in FIGS. 1 and 2.

In order to effectively suppress the splashing of the cooling liquid 100 in the portion C, the floating cover 30 may have a shape in contact with or proximal to the second side wall 26 in the portion C. By eliminating or reducing the gap between the floating cover 30 and the second side wall 26 in the portion C, the splashing of the cooling liquid 100 in the portion C is effectively suppressed.

In addition, in two horizontal directions intersecting each other, the dimension of the floating cover 30 is substantially the same as or slightly smaller than the inner dimension of the reservoir tank 12. For example, in the case of FIG. 2, the left-right dimension on the paper surface of the floating cover 30 is slightly smaller than the left-right dimension on the paper surface of the reservoir tank 12. The top-to-bottom dimension on the paper surface of the floating cover 30 is slightly smaller than top-to-bottom dimension on the paper surface of the reservoir tank 12. Accordingly, the movement of the floating cover 30 in the horizontal direction is effectively suppressed. As a result, in the portion C, the gap between the floating cover 30 and the second side wall 26 can be kept small, and the generation of air bubbles can be effectively suppressed.

As described above, in the example of FIG. 2, the floating cover 30 includes the frame 32. Since the frame 32 has an appropriate rigidity, it does not buckle and can maintain its shape even when subjected to some water pressure. As a result, even if a strong water flow is generated in the reservoir tank 12, the shape of the floating cover 30 is maintained in a shape suitable for suppressing undulation. For example, by providing the frame 32, problems such as "the end portion of the floating cover 30 is broken by the water pressure" do not occur. As a result, by providing the frame 32, it is possible to more effectively suppress the generation of air bubbles.

Note that all of the configurations described above are examples, and other configurations may be appropriately changed as long as the configuration of claim 1 is provided. For example, in the above description, the float portion 36 is provided at the end of the frame 32. However, the float portion 36 may be omitted if the floating cover 30 can appropriately transition to the deployed state and float on the liquid surface. In this case, the size and specific gravity of the frame 32 and the covering sheet 34 may be adjusted so that the floating cover 30 in the deployed state floats on the liquid surface.

Figure 4:
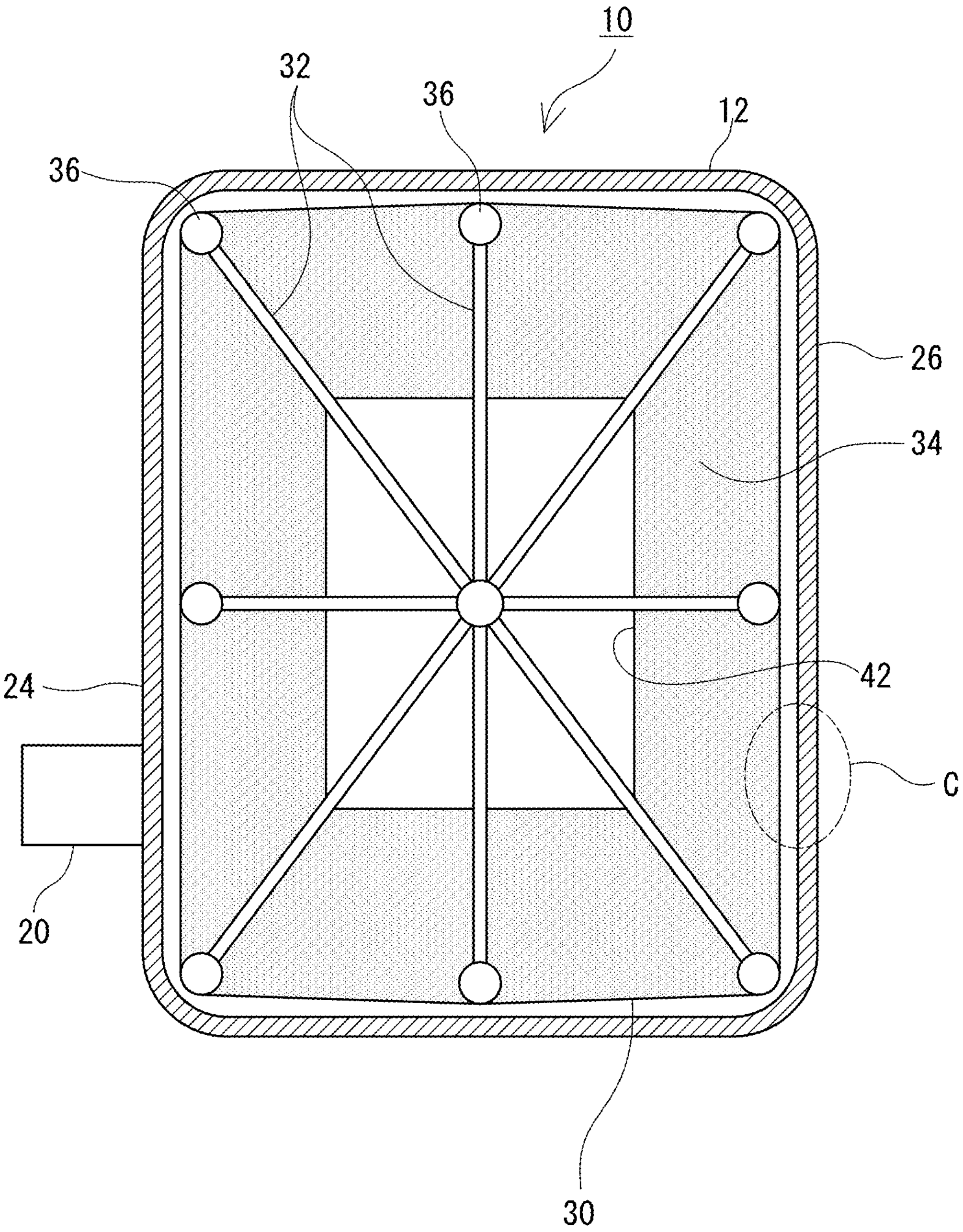
FIG. 4 is a top view of another floating cover.
Figure 5:
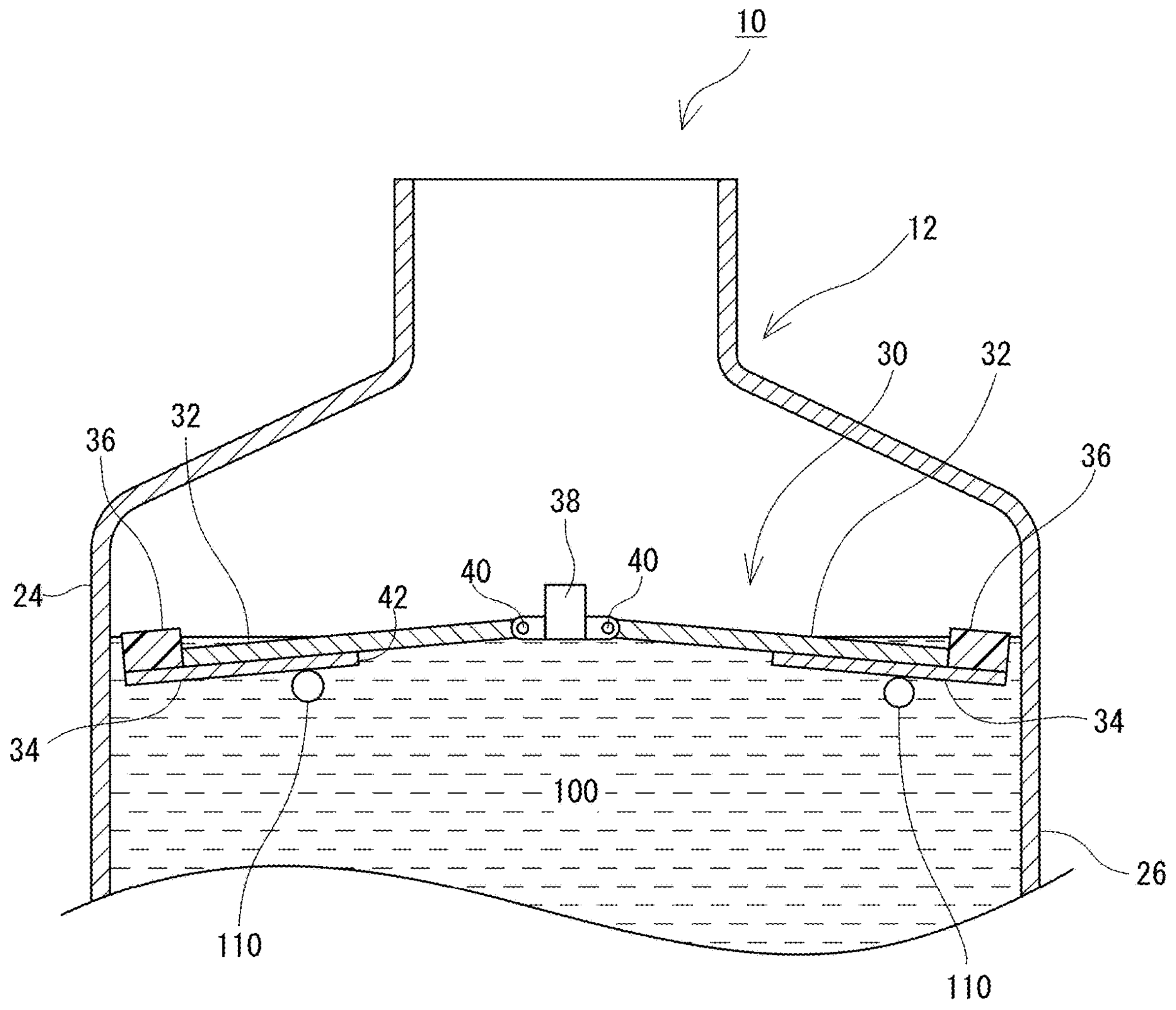
FIG. 5 is a cross-sectional view of another floating cover.

In the above description, substantially the entire floating cover 30 is covered with the covering sheet 34. However, as long as the generation of air bubbles can be suppressed, holes may be formed in the covering sheet 34. For example, as shown in FIG. 4, a central hole 42 may be formed substantially at the center of the covering sheet 34. Even in this case, since the portion where the cooling liquid 100 easily splashes, that is, the portion C, is covered with the covering sheet 34, generation of air bubbles can be effectively suppressed. Further, by providing the central hole 42, air bubbles floating on the liquid surface can be efficiently discharged to the upper space. In this case, as shown in FIG. 5, the floating cover 30 may have a mortar shape gradually increasing from the outer peripheral edge toward the center. With this configuration, the air bubbles 110 floating up to the covering sheet 34 are further guided to the central hole 42. In this case, the specific gravity of the float portion 36 may be slightly larger than the specific gravity of the cooling liquid 100 so that the tip of the frame 32 is slightly submerged from the liquid surface.

Figure 6:
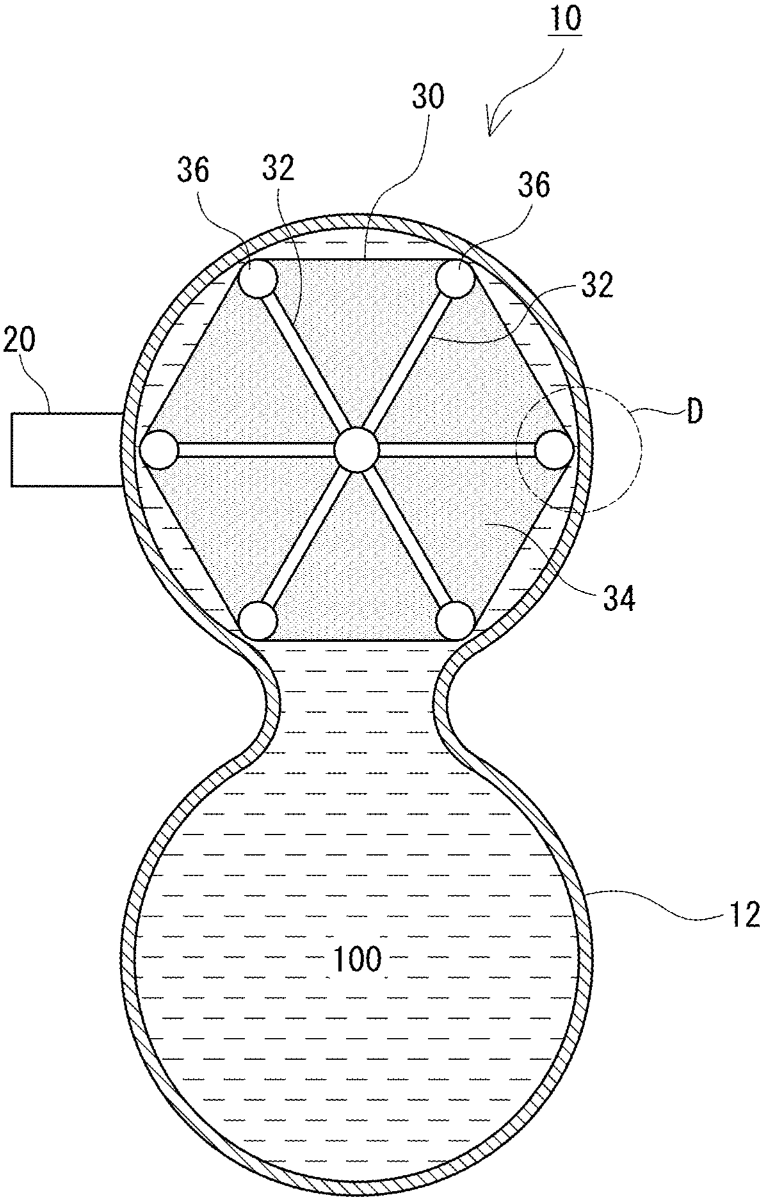
FIG. 6 is a top view of another floating cover.

In addition, in FIGS. 1 to 5, the reservoir tank 12 having a simple shape, for example, a square cross section, is exemplified. However, the techniques disclosed herein may be applied to more complex shaped reservoir tanks 12. For example, as shown in FIG. 6, the reservoir tank 12 may have a peanut-shaped cross section connecting two circles. In this case, the floating cover 30 does not need to cover the entire liquid surface, and may cover only a portion where the cooling liquid 100 is expected to splash. For example, in the case of the example of FIG. 6, splashing of the cooling liquid 100 is predicted at the portion D facing the inflow port 20. Therefore, the floating cover 30 may not cover other portions as long as it can cover the D portion.

REFERENCE SIGNS LIST

10 liquid storage device
12 reservoir tank
14 body
16 shoulder
18 tank inlet
20 inflow port
22 outflow port
24 first side wall
26 second side wall
30 floating cover
32 frame
34 covering sheet
36 float portion
38 central joint
40 hinge
42 central hole
100 cooling liquid
110 air bubbles

The invention claimed is:

1. A liquid storage device, comprising:

a reservoir tank that is equipped on a vehicle and that stores a liquid; and a floating cover that floats on a liquid surface of the liquid in the reservoir tank and that covers at least a part of the liquid surface, wherein the reservoir tank includes:

a body configured to store the liquid; and a tank inlet having a smaller diameter than the body, the floating cover has elasticity to such an extent that the floating cover can change from a stored state in which the floating cover can pass through the tank inlet to a deployed state in which the floating cover is spread along the liquid surface by elastic restoring force, the reservoir tank further includes an inflow port provided on a first side wall of the body and configured to guide the liquid in a horizontal inflow direction, and the floating cover in the deployed state has a shape in contact with or proximal to a second side wall opposed to the first side wall at a position directly facing the inflow port in the inflow direction in a plan view.

2. The liquid storage device according to claim 1, wherein the floating cover has a float portion having a specific gravity smaller than a specific gravity of the liquid.

3. The liquid storage device according to claim 1, wherein the floating cover has an umbrella shape, and the floating cover includes:

a covering sheet covering at least a part of the liquid surface; and a plurality of frames arranged radially and to which the covering sheet is fixed.

4. The liquid storage device according to claim 1, wherein in each of two horizontal directions intersecting each other, a dimension of the floating cover is substantially the same as or slightly smaller than an inner dimension of the reservoir tank.

* * * * *